(12) United States Patent
Harrison

(10) Patent No.: US 6,213,035 B1
(45) Date of Patent: Apr. 10, 2001

(54) FURROW OPENING DISC APPARATUS

(76) Inventor: Fred Harrison, Box 1224, Outlook, Saskatchewan (CA), S0L 2N0

( * ) Notice: Subject to any disclaimer, the term of this patent is extended or adjusted under 35 U.S.C. 154(b) by 0 days.

(21) Appl. No.: 09/375,693

(22) Filed: Aug. 17, 1999

(30) Foreign Application Priority Data

Mar. 16, 1999 (CA) .................................................. 2265367

(51) Int. Cl.$^7$ .................................................. A01C 5/00
(52) U.S. Cl. ......................... 111/164; 111/167; 111/168; 172/575; 172/574
(58) Field of Search .................................. 172/518, 575, 172/576, 579, 599, 603, 604, 538; 111/163, 164, 167, 168, 169, 170, 194

(56) References Cited

U.S. PATENT DOCUMENTS

| | | | | |
|---|---|---|---|---|
| 605,348 | * | 6/1898 | Schultz ................................. | 111/164 |
| 646,506 | * | 4/1900 | Sester ................................... | 172/575 |
| 736,963 | * | 8/1903 | Ham ..................................... | 111/165 |
| 3,058,531 | * | 10/1962 | Beaman et al. .................... | 172/575 X |
| 4,590,869 | * | 5/1986 | Steilen .............................. | 172/575 X |
| 5,398,771 | * | 3/1995 | Hornung et al. ................. | 111/164 X |
| 5,531,171 | * | 7/1996 | Whitesel et al. ...................... | 111/121 |
| 5,724,902 | * | 3/1998 | Janelle et al. .......................... | 111/164 |
| 6,082,276 | * | 7/2000 | Klein et al. ........................... | 111/164 |

* cited by examiner

*Primary Examiner*—Victor Batson
(74) *Attorney, Agent, or Firm*—Koley Jessen P.C.; Mark D. Frederikson

(57) ABSTRACT

A furrow opener apparatus for attachment to an agricultural implement for depositing agricultural material such as seed and fertilizer in the soil. The apparatus comprises a flat disc rotatably attached to the apparatus such its axis of rotation is perpendicular to the direction of travel; a concave disc rotatably attached to the apparatus such that firstly the axis of rotation is perpendicular to the direction of travel, secondly the rear edge of the concave disc is behind the rear edge of the flat disc, thirdly the concave side of the concave disc is facing the flat disc and the outer rim of the concave disc is in close proximity to or touching the side of the flat disc; and means to introduce the agricultural material into the open area between the concave side of the concave disc and the side of the flat disc. The furrow opener requires less power to pull than present openers and penetrates un-tilled soil. A swivel mount and packer are provided for the furrow opener.

20 Claims, 4 Drawing Sheets

FURROW OPENING DISC APPARATUS

This invention is in the field of furrow openers for agriculture and in particular such a furrow opener for utilizing a combination of a flat and a concave disc.

BACKGROUND

Furrow openers for use in depositing seeds, fertilizers and so forth in the soil have been of many types. There are hoe-type openers, which make a furrow by pulling a shovel or knife through the soil. There are also conventional double and single disc openers, or inclined disc openers such as that disclosed in U.S. Pat. No. 5,609,114 to Barton which all utilize a flat disc. Concave discs have also been used, which both till the soil and deposit the seed or fertilizer in the soil, covering them with soil.

With the advent of reduced tillage and increasingly no tillage, the various disc openers have gained interest because of the smaller soil disturbance caused by a disc compared to the hoe-type openers. The prior art disc openers, both flat and concave, have the axis of rotation of the disc at an angle to the direction of travel, rather than perpendicular to the direction of travel, as for instance is common with a wheel. This is required to make a furrow, since a flat disc running straight will only cut a groove in the soil the width of the disc, providing no furrow to receive seeds or fertilizer. The angle of the disc increases the width of this groove into a useable furrow. This requirement increases the power required to pull these furrow openers, and reduces the penetration of the disc in un-tilled soils.

Concave discs have been pulled at an angle to the direction of travel so that the concave side bites into the soil, with the seed being dropped on the convex side of the disc, to be covered over with soil lifted by the concave side of the next following disc. Such discs have not been suitable for no-till operations, because of the amount of soil disturbance. Placement of seed is often unsatisfactory as well with these concave disc furrow openers.

A disc-type furrow opener where the axis of rotation of the discs is perpendicular to the direction of travel would be advantageous by reducing power requirements. Such a disc that would penetrate and provide proper seed placement in un-tilled soils would be beneficial.

SUMMARY OF THE INVENTION

It is an object of the present invention to provide a furrow opener apparatus for depositing agricultural material such as seed and fertilizer in the soil that requires less power to pull than present furrow openers.

It is a further object of the present invention to provide such a furrow opener apparatus that penetrates and provides proper seed placement in un-tilled soils.

The invention accomplishes its objectives providing a furrow opener apparatus for attachment to an agricultural implement for depositing agricultural material such as seed and fertilizer in the soil, said apparatus comprising: a flat disc having first side and a second side rotatably attached to said apparatus such that the axis of rotation of said flat disc is perpendicular to the direction of travel of said implement; a concave disc having a concave side and a convex side, said concave disc rotatably attached to said apparatus such that (1) the axis of rotation of said concave disc is perpendicular to the direction of travel of said implement, (2) the rear edge of said concave disc is behind the rear edge of said flat disc, (3) the concave side of said concave disc is facing said first side of the flat disc and the outer rim of said concave disc is in close proximity to or touching said first side of the flat disc; and means to introduce said agricultural material into the open area between the concave side of said concave disc and said first side of the flat disc.

The means to introduce the agricultural material into the open area between the concave side of the concave disc and the first side of the flat disc can be a tube attached to the apparatus and extending into the lower rear portion of the open area through the space between the rear edge of the front disc and the rear edge of the concave disc.

The flat disc runs straight and ahead of the concave disc. The agricultural material, being seed, fertilizer or the like, will exit the open space between the discs at the point where the bottom of the rear arcs of each disc meet The bottom edge of the flat disc could be below the bottom edge of the concave disc. With the flat disc deeper, it will tend to stay in the deeper position and not be so affected by surface irregularities. The depth of placement would be at some shallower point where the rear arcs of the discs meet. The position of the rear edge of the concave disc relative to said rear edge of the flat disc and/or the position of the bottom edge of the concave disc relative to the bottom edge of the flat disc could be adjustable, allowing for varied placement of the agricultural material.

The apparatus could further comprise a swivel mount such that the apparatus may swivel about a vertical axis relative to the implement, the swivel mount comprising a stop to prevent the apparatus from rotating completely. This would facilitate turning the implement with reduced stress on the apparatus and reduced soil disturbance. The swivel mount could comprise a first pipe adapted at the upper end thereof for attachment to the implement, and a second pipe slidingly and rotatably mounted concentric to the first pipe, the lower end of the second pipe fixedly attached to the apparatus. Many such swivel mounts are known in the art and are considered to fall within the scope of the claimed invention.

The apparatus could comprise a packer rotatably mounted on the apparatus behind the discs for packing the soil over the agricultural material. The packer could be mounted such that the vertical position of the packer with respect to the vertical position of the discs is fixed during operation, and may be adjusted. In this fashion the packer would also act as a depth control mechanism, as the two discs can go no deeper than the packer allows them to go. The discs could be pivotally attached to the implement and biased in a downward direction thereby improving the ground following and depth control of the apparatus.

The packer could comprise a wheel having a first side and a second side, the wheel mounted so as to roll along the ground behind the flat disc and located so that the first side of the wheel is in alignment with the first side of the flat disc and the second side of the wheel is opposite the concave disc. The first side of the wheel could have a smaller diameter than the second side of the wheel such that the outer circumference of the wheel is at an angle to the horizontal and will push soil towards the furrow created by the discs. This packer location and shape would exert force to collapse the straight wall of the furrow onto the agricultural material, increasing the likelihood that agricultural material in the furrow was covered with moist soil rather than dry soil from the surface.

At this time it is contemplated that the most likely combination will be of two discs of close to the same diameter, however it is also contemplated that other combinations where either disc is smaller or larger will have utility as well in some applications.

DESCRIPTION OF THE DRAWINGS:

While the invention is claimed in the concluding portions hereof, preferred embodiments are provided in the accompanying detailed description which may be best understood in conjunction with the accompanying diagrams where like parts in each of the several diagrams are labeled with like numbers, and where:

Figure 1:
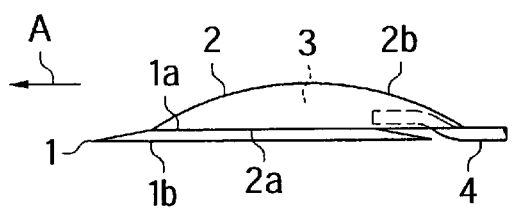
FIG. 1 is a top view of the discs of the apparatus, also showing the position of the agricultural material tube.
Figure 2:
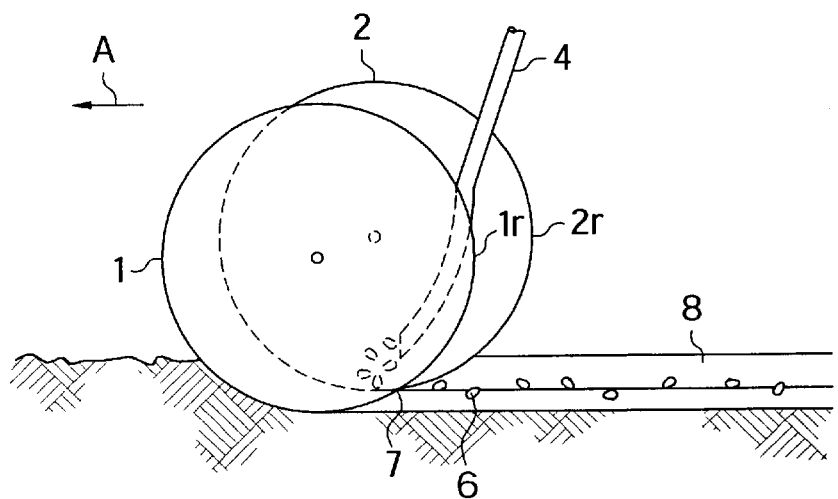
FIG. 2 is a side view of the discs of the apparatus, also showing the position of the agricultural material tube.

DETAILED DESCRIPTION OF THE ILLUSTRATED EMBODIMENTS:

FIGS. 1 and 2 show the orientation of the discs as they travel in direction A. Flat disc 1 has a first side 1a and a second side 1b. The axis of rotation of the flat disc 1 is perpendicular to the direction of travel A. Concave disc 2 has a concave side 2a and a convex side 2b. The axis of rotation of the concave disc 2 is also perpendicular to the direction of travel A. The rear edge 2r of the concave disc 2 is behind the rear edge 1r of the flat disc 1. The concave side 2a of the concave disc 2 is facing the first side 1a of the flat disc 1 and the outer rim 20 of the concave disc 2 is in close proximity to or touching the first side 1a of the flat disc 1. Means to introduce agricultural material such as seed or fertilizer into the open area 3 between the concave side 2a of the concave disc 2 and the first side 1a of the flat disc 1 is shown in the form of a tube 4. The tube 4 is bent so as to pass into the open area 3 between the rear edge 1r of the flat disc 1 and the rear edge 2r of the concave disc 2 and extends into the lower rear portion of the open area 3.

Seeds 6 fall through tube 4 into the lower rear portion of the open area 3. If the seed is carried pneumatically as by an air-seeder, the air escapes through the opening between the rear edges 1r, 2r of the discs 1, 2. The seed 6 is retained in the open area 3 because the outer rim 20 of the concave disc 2 is butted up against the first side 1a of the flat disc 1, so that the seed can only escape at the point where the rear edges 1r, 2r of the discs 1, 2 diverge at seed exit point 7. Gravity and the rolling action of the discs 1, 2 move the seed 6 to the seed exit point 7 where it is deposited in the furrow 8 as illustrated in FIG. 2.

Figure 3:
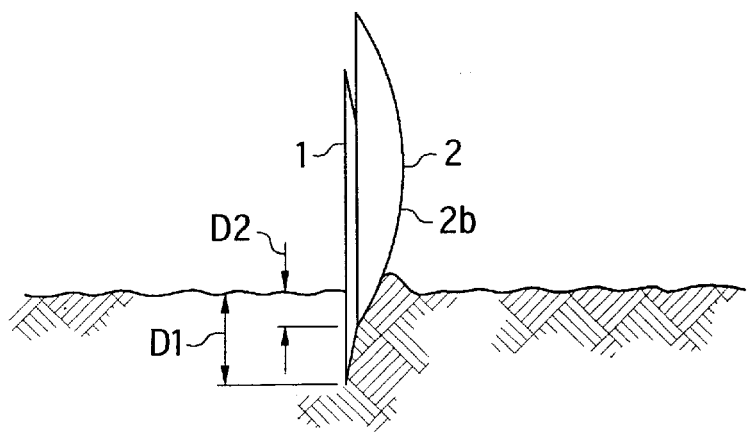
FIG. 3 is a rear view of the discs of the apparatus.

As illustrated in FIG. 3, the flat disc 1 is penetrating the soil to a depth of D1, however the narrow width of the flat disc 1 does not create an appreciable furrow. The furrow 8 is created by the convex side 2b of the concave disc 2 which pushes the soil aside to depth D2. At the point in the line of travel where the seed 6 exits at seed exit point 7, the convex side 2b is above the seed exit point 7 and is holding this soil away so that the seed 6 may be deposited in the furrow 8. As the furrow opener proceeds, some of the loose dirt that was pushed away may fall back into the furrow on top of the seed, however at the seed exit point 7, the furrow 8 is held open for deposition of the seed 6.

Figure 4:
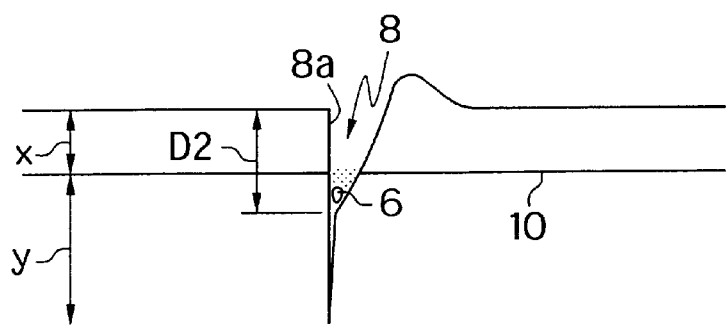
FIG. 4 is a cross-section view of the furrow created by the apparatus.

FIG. 4 illustrates the furrow formed by the furrow opener in a typical agricultural soil profile where the layer indicated by X is dry soil and the area indicated by Y is moist soil. The boundary 10 between these two layers is commonly very defined. The object in seeding is to place the seeds 6 into the moist soil Y just deep enough to ensure germination. The relative vertical positions of the axes of the discs 1, 2 can be adjusted to the right combination to accomplish this in different soil conditions. In un-tilled soils it may be desired to run the flat disc 1 deeper to ensure penetration, however the depth D2 of the concave disc 2, and therefore the depth of the furrow 8, may be maintained by raising the axis of the concave disc 2 relative to that of the flat disc 1. The opposite adjustment may be desired in soft or loose soils.

The relative horizontal positions along the line of travel of the axes of the discs 1, 2 can be adjusted as well to provide flexibility for different conditions.

Figure 5:
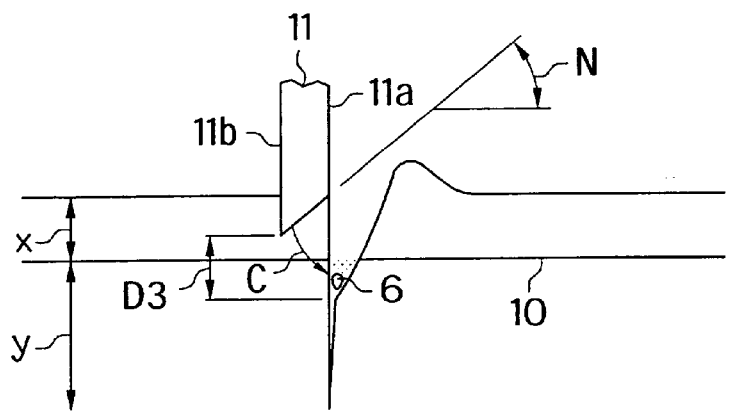
FIG. 5 is a cross-section view of the furrow created by the apparatus with a packer wheel rolling adjacent to the furrow.
Figure 6:
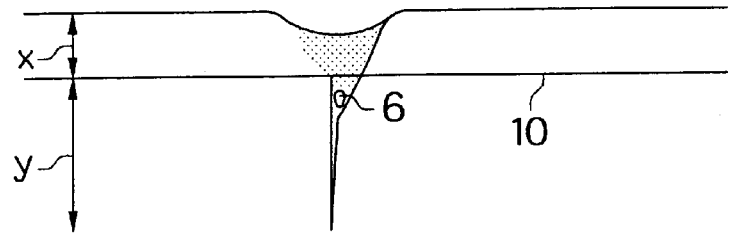
FIG. 6 is a cross-section view of the furrow created by the apparatus after the packer wheel has passed and the furrow is closed.

Packing of the furrow 8 is generally desired in order to ensure good seed to soil contact. This can be accomplished with a wheel 11 following the furrow opener over top of the furrow 8. This wheel 11 may also provide a control on the depth of penetration of the discs 1,2 where the vertical position of the wheel with respect to the vertical position of the discs is fixed during operation. As illustrated in FIG. 5, the difference between the bottom of the wheel 11 and the bottom of the concave disc 2 (also the bottom of the furrow 8), indicated as D3, is then constant. The discs 1, 2 could be pivotally attached to the implement and biased in a downward direction. The wheel 11 rolling along the furrow 8 would then maintain the proper depth as the apparatus rolled along the ground moving up and down relative to the implement as it followed the contours of the soil.

Figure 7:
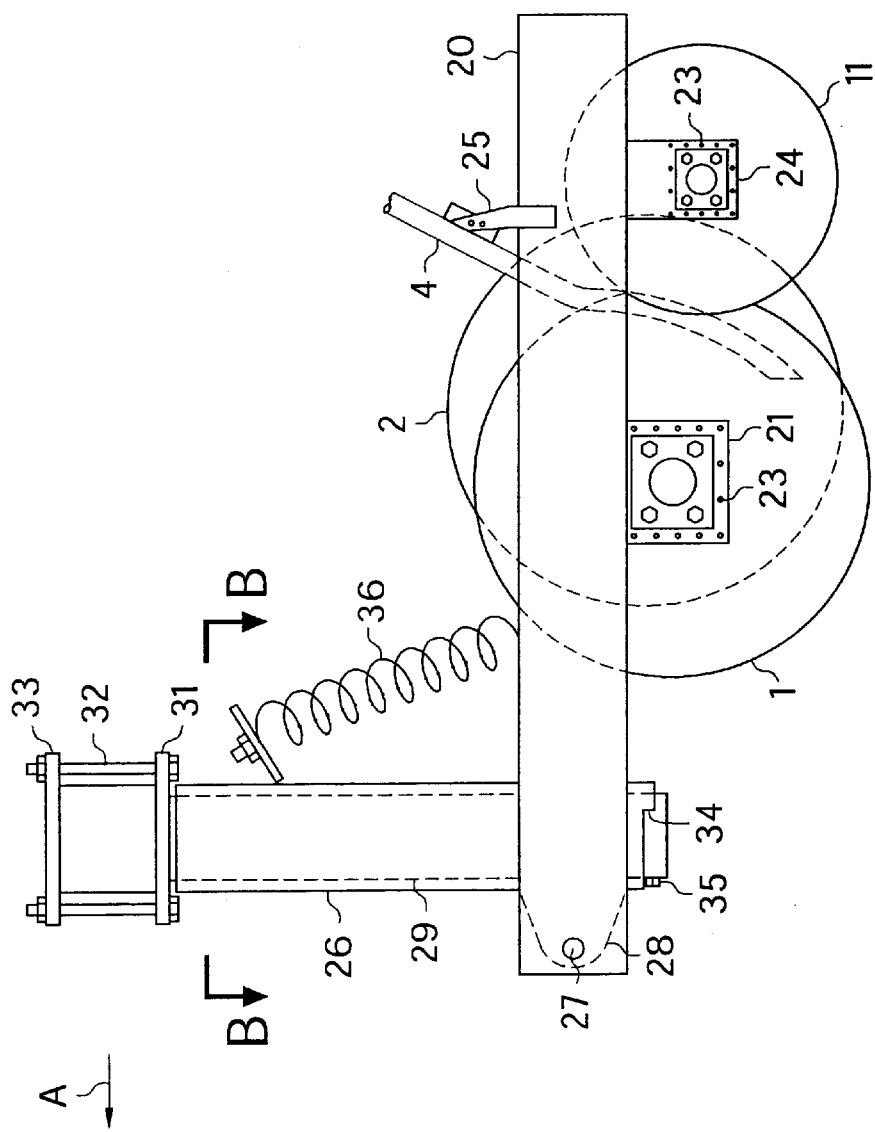
FIG. 7 is a side view of one embodiment of the apparatus.
Figure 8:
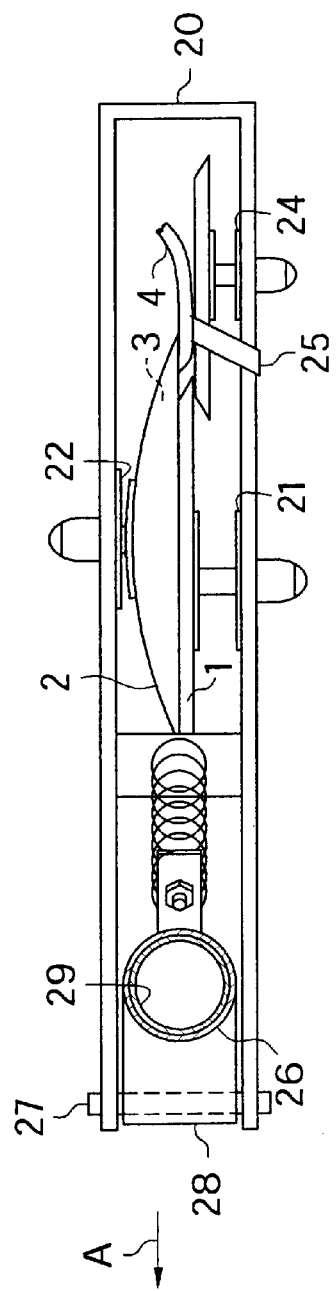
FIG. 8 is a cross-sectional view along line BB in FIG. 7.

FIGS. 7 and 8 illustrate one embodiment of an apparatus for mounting the discs 1, 2 and packer wheel 11 in the orientation described above. Flat disc 1 is rotatably mounted by a conventional hub and bearing to flat disc bracket 21 which is welded to disc frame 20. A similar concave disc bracket 22 on the opposite side of the disc frame 20 is provided for similar rotatable mounting of the concave disc 2. A plurality of adjustment holes 23 in flat disc bracket 21 and concave disc bracket 22 allow adjustment of the axes of the two discs 1, 2 to be adjusted relative to one another. Similarly wheel 11 is adjustably and rotatably attached to the wheel bracket 24 welded to the disc frame 20. Wheel 11 is mounted close behind the discs 1, 2 in order to collapse the straight furrow wall 8a onto the seed 6 as soon as possible and minimize the amount of dry soil that falls into the furrow 8.

Seed 6 or other agricultural material is introduced through tube 4 which is secured in place by attachment thereof to tube bracket 25 welded to disc frame 20. The tube 4 is bent so as to pass into the open area 3 between the rear edge 1r of the flat disc 1 and the rear edge 2r of the concave disc 2 and extends into the lower rear portion of the open area 3.

The front of the disc frame 20 is pivotally mounted to the outside pipe 26 by pivot pin 27 through the disc frame 20 and pivot bracket 28 such that the disc frame 20 may pivot up or down. The apparatus is also attached to the implement by a swivel mount. Inside pipe 29 is welded to the bottom plate 31 which is clamped to the implement frame 30 by bolts 32 through top plate 33. Outside pipe 26 slides over inside pipe 29 such that the apparatus may rotate about a vertical axis relative to the implement frame 30. Stop 35 is bolted to the bottom front of the inside pipe 29, and the bottom of the outside pipe 26 is secured in position by resting thereon The outside pipe has a lip 34 at the bottom rear thereof which contacts the stop 35 and so prevents the apparatus from rotating completely around the vertical axis.

The swivel mount facilitates turning of the implement while the apparatus is in the ground.

The disc frame 20 is biassed downwards by spring 36 attached between the outside pipe 26 and the disc frame 20. Thus as the implement travels over the ground, the disc frame 20 may move up and down to follow the ground contours and the packer wheel 11 will be forced into contact with ground by the spring 36. The packer wheel 11 will maintain the proper depth of the furrow 8 by preventing the discs 1, 2 from going deeper than the wheel 11 will allow.

As illustrated in FIGS. 5 and 8, the first side 11a of the wheel 11 has a smaller diameter than the second side 1b thereof such that the outer circumference of the wheel 11 is at an angle N to the horizontal and will push soil towards the furrow 8 created by the discs 1, 2. The first side 11a of the wheel 11 is aligned with the straight wall 8a of the furrow 8 so that the wheel 11 is rolling over undisturbed soil. This location combined with the angle N on the wheel circumference will collapse the straight wall 8a of the furrow 8 and makes it more likely that the seeds 6 or other agricultural material is covered with moist soil from the straight wall 8a of the furrow 8, as indicated by the arrow C in FIG. 5.

Figure 9:
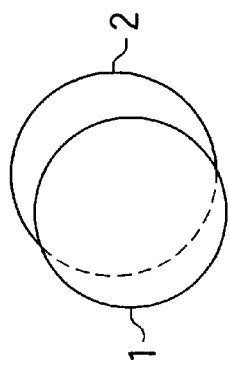
FIG. 9 shows the discs of an embodiment where the flat disc has a diameter larger than the concave disc.
Figure 10:
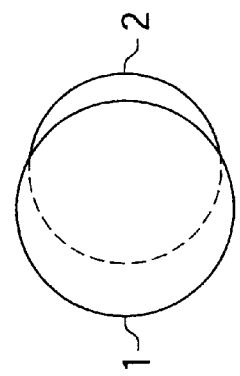
FIG. 10 shows the discs of an embodiment where the concave disc has a diameter larger than the flat disc.

In the above figures, the flat and concave discs 1, 2 have equal diameters. It is however contemplated that embodiments where the flat disc has a larger diameter than the concave disc, as illustrated in FIG. 9 and where the concave disc has a larger diameter than the flat disc, as illustrated in FIG. 10 would also be useful, as the same effect may be obtained with such disc combinations.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A furrow opener apparatus for attachment to an agricultural implement for depositing agricultural material in the soil, said apparatus comprising:

a flat disc having a first side and a second side rotatably attached to said apparatus such that an axis of rotation of said flat disc is substantially perpendicular to a direction of travel of said implement;

a concave disc having a concave side and a convex side, said concave disc rotatably attached to said apparatus such that:

an axis of rotation of said concave disc is substantially perpendicular to the direction of travel of said implement;

a rear edge of said concave disc is behind a rear edge of said flat disc;

the concave side of said concave disc is facing said first side of the flat disc and an outer rim of said concave disc is in close proximity to or touching said first side of the flat disc;

means to introduce said agricultural material into an open area between the concave side of said concave disc and said first side of the flat disc.

2. The apparatus of claim 1 wherein said means to introduce said agricultural material into the open area between the concave side of said concave disc and said first side of the flat disc is a tube attached to said apparatus and extending into said open area.

3. The apparatus of claim 1 wherein a bottom edge of said concave disc is above a bottom edge of said flat disc.

4. The apparatus of claim 1 wherein a position of said rear edge of the concave disc is adjustable relative to said rear edge of the flat disc.

5. The apparatus of claim 1 wherein a position of a bottom edge of the concave disc is adjustable relative to a bottom edge of the flat disc.

6. The apparatus of claim 1 further comprising a swivel mount such that said apparatus may swivel about a vertical axis relative to said implement, said swivel mount comprising a stop to prevent said apparatus from rotating completely.

7. The apparatus of claim 6 wherein said swivel mount comprises a first pipe adapted at an upper end thereof for attachment to said implement, and a second pipe slidingly and rotatably mounted concentric to said first pipe, a lower end of said second pipe fixedly attached to said apparatus.

8. The apparatus of claim 1 further comprising a packer rotatably mounted on said apparatus behind said discs for packing soil over said agricultural material.

9. The apparatus of claim 8 wherein said packer is mounted such that a vertical position of said packer with respect a vertical position of said discs is fixed during operation, and may be adjusted, thereby providing a control on a depth of penetration of said discs.

10. The apparatus of claim 9 wherein said attachment to the implement is a pivotal attachment and further comprising a biasing element between said furrow opener apparatus and said implement exerting a downward force on said furrow opener apparatus.

11. The apparatus of claim 8 wherein said packer comprises a wheel having a first side and a second side, said wheel mounted so as to roll along the ground behind said flat disc and located so that said first side of said wheel is in alignment with said first side of the flat disc and said second side of the wheel is opposite said concave disc.

12. The apparatus of claim 11 wherein said first side of the wheel has a smaller diameter than said second side of the wheel such that an outer circumference of said wheel is at an angle to the horizontal and will push soil towards a furrow created by said discs.

13. The apparatus of claim 1 wherein said flat and concave discs have equal diameters.

14. The apparatus of claim 1 wherein said flat disc has a larger diameter than said concave disc.

15. The apparatus of claim 1 wherein said concave disc has a larger diameter than said flat disc.

16. The apparatus of claim 1 wherein the axis of rotation of the flat disc and the axis of rotation of the concave disc are substantially horizontal.

17. The apparatus of claim 16 wherein said axes of rotation of the discs are substantially horizontal.

18. The apparatus of claim 16 further comprising a packer rotatably mounted on said apparatus behind said discs for packing soil over said agricultural material.

19. The apparatus of claim 16 wherein said said apparatus is adapted to be pivotally attached to the implement and further comprising a biasing element to extend between said furrow opener apparatus and said implement to exert a downward force on said furrow opener apparatus.

20. A furrow opener apparatus for attachment to an agricultural implement for depositing agricultural material in the soil, said apparatus comprising:

a flat disc having a first side and a second side rotatably attached to said apparatus such that an axis of rotation of said flat disc is substantially perpendicular to a direction of travel of said implement;

a concave disc having a concave side and a convex side, said concave disc rotatably attached to said apparatus such that:
an axis of rotation of said concave disc is substantially parallel to the axis of rotation of said flat disc;
a rear edge of said concave disc is behind a rear edge of said flat disc;
the concave side of said concave disc is facing said first side of the flat disc and an outer rim of said concave disc is in close proximity to or touching said first side of the flat disc;

a tube attached to said apparatus and extending into an open area between the concave side of said concave disc and said first side of the flat disc to introduce said agricultural material into said open area.

\* \* \* \* \*